United States Patent
Tsai

(10) Patent No.: US 12,489,495 B2
(45) Date of Patent: Dec. 2, 2025

(54) METHOD AND APPARATUS FOR TRANSCEIVING CAPABILITY AUGMENTATION BASED ON DEVICE COLLABORATION IN MOBILE COMMUNICATIONS

(71) Applicant: MediaTek Inc., Hsinchu (TW)

(72) Inventor: Lung-Sheng Tsai, Hsinchu (TW)

(73) Assignee: MediaTek Inc. (TW)

( * ) Notice: Subject to any disclaimer, the term of this patent is extended or adjusted under 35 U.S.C. 154(b) by 32 days.

(21) Appl. No.: 18/432,137

(22) Filed: Feb. 5, 2024

(65) Prior Publication Data

US 2024/0333348 A1    Oct. 3, 2024

Related U.S. Application Data

(60) Provisional application No. 63/493,324, filed on Mar. 31, 2023.

(51) Int. Cl.
*H04B 7/0456* (2017.01)

(52) U.S. Cl.
CPC .................. *H04B 7/0456* (2013.01)

(58) Field of Classification Search
CPC ..... H04W 72/30; H04W 72/02; H04B 7/0456
See application file for complete search history.

(56) References Cited

U.S. PATENT DOCUMENTS

| | | | |
|---|---|---|---|
| 11,018,738 B2* | 5/2021 | Huang | H04B 7/0469 |
| 2011/0110403 A1* | 5/2011 | Jongren | H04L 27/2636 |
| | | | 375/296 |
| 2013/0088996 A1* | 4/2013 | Hara | H04W 88/06 |
| | | | 370/312 |
| 2016/0337894 A1 | 11/2016 | Lim et al. | |
| 2023/0094330 A1 | 3/2023 | Chen | |

FOREIGN PATENT DOCUMENTS

| | | |
|---|---|---|
| CN | 113747590 A | 12/2021 |
| CN | 113810086 A | 12/2021 |
| CN | 115769613 A | 3/2023 |

OTHER PUBLICATIONS

Taiwan Intellectual Property Office, Office Action in Taiwan Patent Application No. 113110294, Mar. 5, 2024.

* cited by examiner

*Primary Examiner* — Vineeta S Panwalkar
(74) *Attorney, Agent, or Firm* — Andy M. Han; Han IP PLLC

(57) ABSTRACT

Examples pertaining to transceiving capability augmentation of a communication apparatus in mobile communications are described. A user equipment (UE) transmits a first radio frequency (RF) signal carrying a first baseband signal in a first frequency band to a network node and transmits a second RF signal carrying a second baseband signal in a second frequency band to a collaborating communication apparatus. The first baseband signal and the second baseband signal are identical, and the first frequency band is different from the second frequency band.

18 Claims, 5 Drawing Sheets

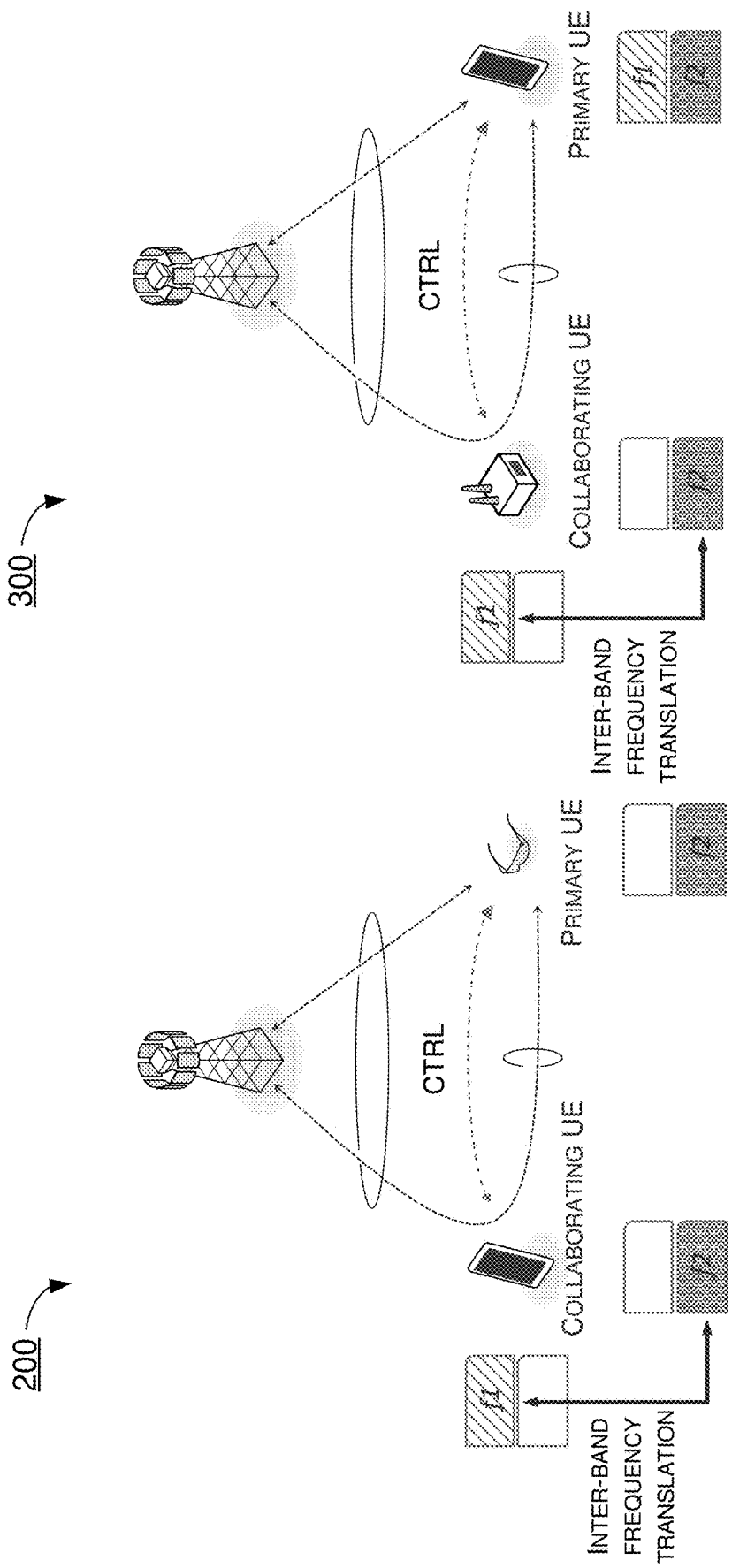

METHOD AND APPARATUS FOR TRANSCEIVING CAPABILITY AUGMENTATION BASED ON DEVICE COLLABORATION IN MOBILE COMMUNICATIONS

CROSS REFERENCE TO RELATED PATENT APPLICATION(S)

The present disclosure is part of a non-provisional application claiming the priority benefit of U.S. Patent Application No. 63/493,324, filed 31 Mar. 2023, the content of which herein being incorporated by reference in its entirety.

TECHNICAL FIELD

The present disclosure is generally related to mobile communications and, more particularly, to transceiving capability augmentation of a user equipment (UE) based on device collaboration in mobile communications.

BACKGROUND

Unless otherwise indicated herein, approaches described in this section are not prior art to the claims listed below and are not admitted as prior art by inclusion in this section.

Massive multiple-input multiple-output (MIMO) technology plays a crucial role in boosting spectral efficiency and signal robustness in fifth generation (5G) New Radio (NR). With the breakthrough of practical antenna systems, accommodating large numbers of digital antenna ports at a network node has become feasible from an implementation standpoint.

Although the MIMO enhancement has been achieved at the network side, physical hardware limitation at the UE side is still a bottleneck for MIMO gain improvement.

Accordingly, how to achieve transceiving capability augmentation for the UE to improve the overall MIMO performance becomes an important issue for the newly developed wireless communication network.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to transceiving capability augmentation of a communication apparatus based on device collaboration in mobile communications.

In one aspect, a method may involve a communication apparatus transmitting a first radio frequency (RF) signal carrying a first baseband signal in a first frequency band to a network node and transmitting a second RF signal carrying a second baseband signal in a second frequency band to a collaborating communication apparatus, wherein the first baseband signal and the second baseband signal are identical, and wherein the first frequency band is different from the second frequency band.

In one aspect, a communication apparatus may involve a transceiver which, during operation, wirelessly communicates with at least one network node. The communication apparatus may also involve a processor communicatively coupled to the transceiver such that, during operation, the processor performs following operations: transmitting, via the transceiver, a first radio frequency (RF) signal carrying a first baseband signal in a first frequency band to the network node; and transmitting, via the transceiver, a second RF signal carrying a second baseband signal in a second frequency band to a collaborating communication apparatus, wherein the first baseband signal and the second baseband signal are identical, and wherein the first frequency band is different from the second frequency band.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram depicting an example scenario of diversity augmentation based on device collaboration in accordance with implementations of the present disclosure.

FIG. 3 is a diagram depicting an example scenario of rank augmentation based on device collaboration in accordance with implementations of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to transceiving capability augmentation (e.g., antenna capability augmentation) of a communication apparatus based on device collaboration. According to the present disclosure, a number of possible solutions may be implemented separately or jointly. That is, although these possible solutions may be described below separately, two or more of these possible solutions may be implemented in one combination or another.

Figure 1:
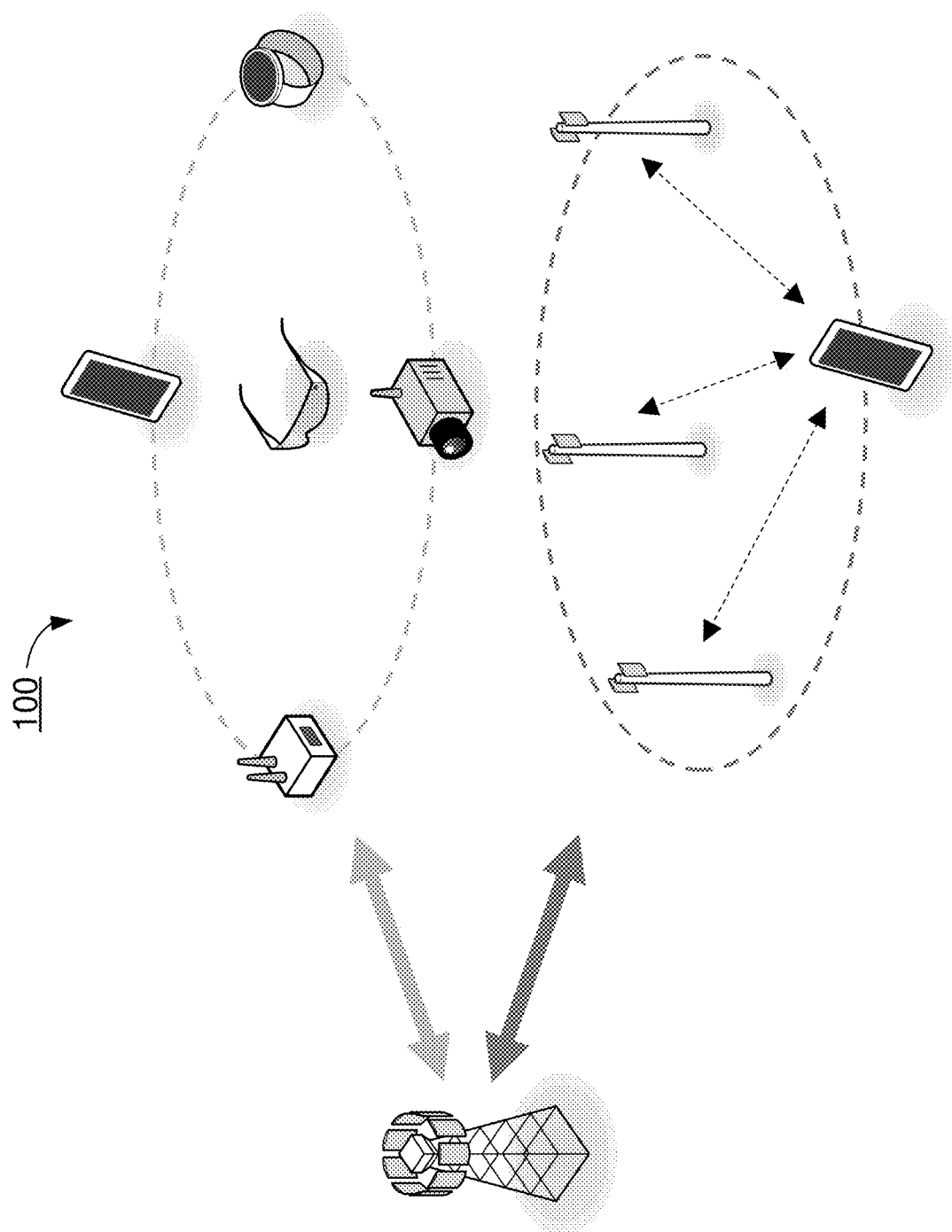
FIG. 1 is a diagram depicting an example scenario of a mobile communications network in accordance with implementations of the present disclosure.

FIG. 1 illustrates an example scenario 100 of a mobile communications network to implement device collaboration in accordance with implementations of the present disclosure. A personal area network (PAN) may support extended reality (XR)-like services, such as XR glasses with a mobile phone or a customer premises equipment (CPE). A public network may comprise one or more repeaters and mobile phones. In some implementations, at least one device may be a collaborating communication apparatus to facilitate augmentation in transceiving capability (e.g., antenna capability, diversity, rank, or others) of a primary communication apparatus in the mobile communications network.

FIG. 2 illustrates an example scenario 200 of diversity augmentation based on device collaboration in accordance with implementations of the present disclosure. A high-capability device (e.g., a smartphone) may serve as a proxy to provide a good-quality data path for a low-capability device (e.g., XR glasses). In this device collaboration scenario, the high-capability device may be a collaborating communication apparatus or a collaborating UE and the low-capability device may be a primary communication apparatus or a primary UE. A device-control path CTRL may be established between the primary UE and the collaborating UE to exchange critical information, including channel state information (CSI), repeater-mode enabling, power control etc.

The collaborating UE may communicate with a network node (such as a satellite, a base station or a network apparatus in the mobile communications network) in a first frequency band f1 and communicate with the primary UE in a second frequency band f2. The collaborating UE may perform inter-band frequency translation to shift the radio frequency (RF) carrier of the received signal from the first frequency band f1 to the second frequency band f2 and vice versa. This device collaboration is applicable to both uplink and downlink transmissions.

Compared to smartphones, a wearable device typically has less capability in terms of MIMO processing capability, number of transmitting (Tx) or receiving (Rx) antennas, carrier aggregation (CA) capability, etc. FIG. 2 illustrates that the collaborating UE (e.g., a 4Rx smartphone) as an intermediate node works together with a 2Rx wearable device with 1 component carrier (CC) capability. The smartphone may act as an advanced amplify and forward (AF) repeater with better Rx beamforming capability (i.e., more receive antennas), and may purify signal quality by rejecting interference coming from un-expected directions, and forward processed signal to the low-capability wearable device.

FIG. 3 illustrates an example scenario 300 of rank augmentation based on device collaboration in accordance with implementations of the present disclosure. One smartphone and one collaborating device (such as a relay device, another smartphone, an indoor CPE, or others) collaborate to receive, at the smartphone, a resulting high-rank data signal transmitted from the network node (such as a satellite, a base station or a network apparatus in the mobile communications network).

In this device collaboration scenario, the smartphone may be a primary communication apparatus or a primary UE and the aforementioned collaborating device may be a collaborating communication apparatus or a collaborating UE. The primary UE may communicate with the network node in a first frequency band f1 and communicate with the collaborating UE in a second frequency band f2. The collaborating UE may communicate with the network node in the first frequency band f1 as the primary UE does, and communicate with the primary UE in the second frequency band f2. The collaborating UE may perform inter-band frequency translation to shift the RF carrier of the received signal from the first frequency band f1 to the second frequency band f2 and vice versa. This device collaboration is also applicable to both uplink and downlink transmissions.

A device-control path CTRL may be established between the primary UE and the collaborating UE to exchange critical information, including CSI, repeater-mode enabling, power control etc. The primary UE utilizes its CA capability to receive signals directed from the base-station and the collaborating UE simultaneously in two bands f1 and f2 and processes the received signals jointly, as if having two sets of Rx antennas. The network node transmits a signal in frequency band f1 to an end-device that appears to be equipped with two sets of Rx antennas in a single band, so the rank of the end-to-end MIMO channel rank is doubled.

Figure 4:
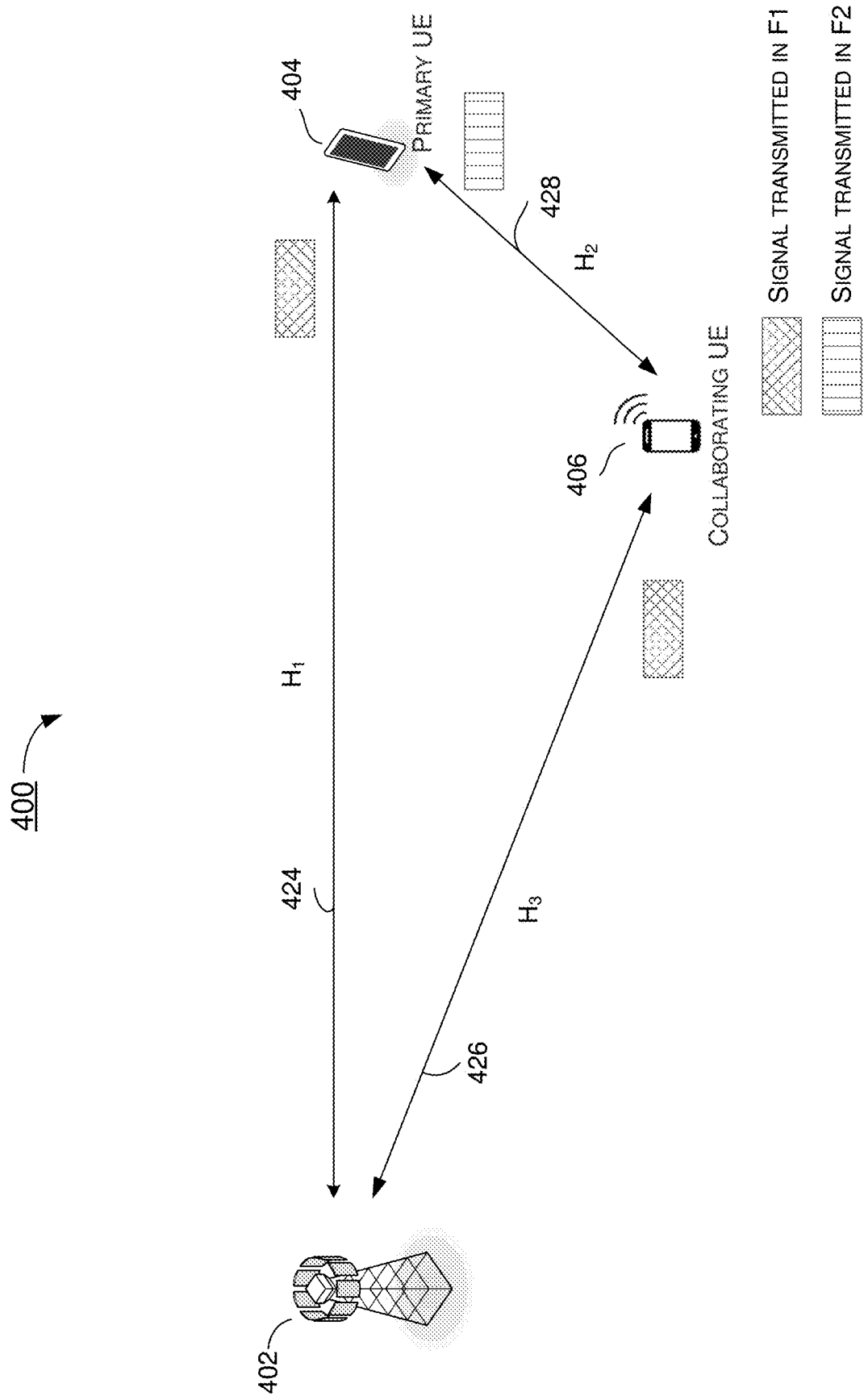
FIG. 4 is a diagram depicting an example scenario of transceiving capability augmentation based on device collaboration in accordance with implementations of the present disclosure.

FIG. 4 illustrates an example scenario 400 of transceiving capability augmentation based on device collaboration in accordance with implementations of the present disclosure. In this example, a collaborating communication apparatus (denoted as collaborating UE 406 in FIG. 4) may be placed near a primary communication apparatus (denoted as primary UE 404 in FIG. 4) or placed between a network node 402 (such as a satellite, a base station or a network apparatus in the mobile communications network) and the primary UE 404.

The primary UE 404 may communicate with the network node 402 in a first frequency band f1 and communicate with the collaborating UE 406 in a second frequency band f2. The collaborating UE 406 may communicate with the network node 402 in the first frequency band f1 as the primary UE 404 and communicate with the primary UE 404 in the second frequency band f2. The collaborating UE 406 may perform inter-band frequency translation to shift the RF carrier of the received signal from the first frequency band f1 to the second frequency band f2 and vice versa. This device collaboration is also applicable to both uplink and downlink transmissions In some implementations, the primary UE 404 may simultaneously or substantially simultaneously transmit signals on two different time-frequency resources or in two different frequency bands f1 and f2.

In some implementations, the primary UE 404 may comprise multiple physical antennas, and the physical antennas may be shared on the two different time-frequency resources or the two different frequency bands to reduce chip area cost of the primary UE 404. Note that the primary UE 404 may also use two different groups of antennas to respectively transmit signals on two different time-frequency resources or in two different frequency bands, and the invention is not limited to any type of implementation.

In one example, the primary UE 404 may have 4 physical antennas (i.e., physical antennas 1 to 4) and may have 4 layers of data (i.e., layers 1 to 4) to be transmitted. Further, each layer of data corresponds to an antenna port. In a first configuration, the primary UE 404 maps a particular layer to a particular physical antenna. For example, the layer 1 data is transmitted through the physical antenna 1, the layer 2 data is transmitted through the physical antenna 2, and so on. This may be referred to as a non-coherent mode. In a second configuration, at the primary UE 404, at least one particular layer is mapped to at least two physical antennas and at least one physical antenna is not mapped with at least one layer of the 4 layers of data. For example, the layer 1 data is transmitted through the physical antenna 1 and the physical antenna 2, the layer 2 data is transmitted through the physical antenna 3 and the physical antenna 4, . . . , and so on. This may be referred to as a partial-coherent mode. In a third configuration, each layer of data is mapped to all physical antennas. This is referred to as a full-coherent mode.

For some detailed explanation using signal models, in some implementations, the primary UE 404 may generate 4 layers baseband data signals $x_1, x_2, \ldots, x_4$, which are the data signals to be transmitted to the network node and may be represented by a vector:

$$x_{4\times 1} = \begin{bmatrix} x_1 \\ x_2 \\ x_3 \\ x_4 \end{bmatrix}$$

The primary UE 404 may divide the symbol $x_{4\times 1}$ into two groups of signals $x_{2\times 1}^{(1)}$ and $x_{2\times 1}^{(2)}$, where the first baseband signal $x_{2\times 1}^{(1)}$ is to be transmitted to the network node 402 through the channel 424 (which may be regarded as a direct path or direct link) and the second baseband signal $x_{2\times 1}^{(1)}$ is to be transmitted to the collaborating UE 406 and then transmitted to the network node 402 through the channels 428 and 426 (which may be regarded as an indirect path or indirect link). The primary UE 404 may apply a first precoder (or a first linear transformation) represented as $P'_{2\times 2}^{(1)}$ on the first baseband signal $x_{2\times 1}^{(1)}$, and apply a second precoder (or a second linear transformation) represented as $P'_{2\times 2}^{(2)}$ on the second baseband signal $x_{2\times 1}^{(2)}$. As an example, the primary UE 404 may map the first baseband signal x to a first group of physical antennas (e.g., comprising two physical antennas) to generate two superimposed signals represented as $P'_{2\times 2}^{(1)} \cdot x_{2\times 1}^{(1)}$, and map the second baseband signal $x_{2\times 1}^{(2)}$ to a second group of physical antennas (e.g., comprising two physical antennas) to generate two superimposed signals represented as $P'_{2\times 2}^{(2)} \cdot x_{2\times 1}^{(2)}$.

Further, the primary UE 404 may mix the superimposed signals with the corresponding RF carriers and transmit the resulting RF signals at the corresponding group of physical antennas.

For the direct path, the network node 402 may receive the RF signals from the primary UE 404 through the channel 424, which may be represented as $H_1$.

For the indirect path, the collaborating UE 406 may receive the RF signals from the primary UE 404 through the channel 428, which may be represented as $H_2$, and the network node 402 may receive the RF signals from the collaborating UE 406 through the channel 426, which may be represented as $H_3$. The collaborating UE 406 may relay or forward the received RF signals, with some necessary processing such as, but not limited to, amplification or linear combination, to the network node 402. The impact of the signal processing at the collaborating UE 406 to the received signals may be represented by a linear transformation matrix $G_{2\times 4}$.

For the scenario of non-coherent joint transmission (NCJT) across two virtual panels where each layer is carried by one panel, the received signal $r_{n\times 1}$ at the network node 402, if extracted from the RF signals received at the physical antennas of the network node 402, may be represented as:

$$r_{n\times 1} = H_{1_{n\times 2}} \cdot P'^{(1)}_{2\times 2} \cdot x^{(1)}_{2\times 1} + H_{3_{n\times 2}} \cdot G_{2\times 4} \cdot H_{2_{4\times 2}} P'^{(2)}_{2\times 2} \cdot x^{(2)}_{2\times 1} \quad \text{Eq. (1)}$$

For the scenario of coherent joint transmission (CJT) across two virtual panels where each layer is carried by two panels, the degrees of freedom of the precoder design are increased (as an example, increased from two 2×2 precoding matrices to one 4×4 precoding matrix), and the received signal $r_{n\times 1}$ at the network node 402, if extracted from the RF signals received at the physical antennas of the network node 402, may be represented as:

$$r_{n\times 1} = \left( H_{1_{n\times 2}} \cdot P^{(1)}_{2\times 4} + H_{3_{n\times 2}} \cdot G_{2\times 4} \cdot H_{2_{4\times 2}} \cdot P^{(2)}_{2\times 4} \right) \cdot x_{4\times 1} = \quad \text{Eq. (2)}$$

$$\left[ H_{1_{n\times 2}} \; H_{3_{n\times 2}} \cdot G_{2\times 4} \cdot H_{2_{4\times 2}} \right] \begin{bmatrix} P^{(1)} \\ P^{(2)} \end{bmatrix}_{4\times 4} \cdot x_{4\times 1}$$

In some implementations, for the NCJT case, the primary UE (e.g., the primary UE 404) may transmit identical baseband signal on the aforementioned two different time-frequency resources or in two different frequency bands, such as the frequency bands f1 and f2 shown in FIG. 4. Taking the signal model in equation Eq. (1) as an example, the identical baseband signal may be expressed as $x_{2\times 1}^{(1)} = x_{2\times 1}^{(2)}$.

More specifically, in some implementations of device collaboration, a communication apparatus (e.g., a primary communication apparatus or a primary UE) may transmit a first RF signal carrying a first baseband signal in a first frequency band (e.g., first frequency band f1) to a network node and transmit a second RF signal carrying a second baseband signal in a second frequency band (e.g., second frequency band f2) to a collaborating communication apparatus. The second RF signal is to be converted to the first frequency band by the collaborating communication apparatus. The first baseband signal and the second baseband signal are identical, and the second baseband signal is to be received at the network node. In some implementations, the first frequency band is different from the second frequency band.

In some implementations, for uplink transmission, the collaborating communication apparatus may receive the second RF signal from the primary communication apparatus on the second frequency band f2, shifts the RF carrier of the RF signals to the first frequency band f1, and then transmits the shifted RF signals (e.g., a third RF signal) on the first frequency band f1 to the network node. For downlink transmission, the collaborating communication apparatus may receive the RF signal on the first frequency band f1 from the network node, shifts the RF carrier of the RF signals to the second frequency band f2, and then transmits the shifted RF signals on the second frequency band f2 to the primary communication apparatus. Each frequency band is an interval in frequency domain.

In some implementations, the identical baseband signal may comprise identical data or identical reference signal, such as demodulation reference signal (DMRS). That is, in some implementations, the first baseband signal and the second baseband signal may be or may comprise baseband data signals. In some implementations, the first baseband signal and the second baseband signal may be or may comprise reference signals.

In some implementations, by transmitting identical baseband data signals or identical reference signals, the network node does not need to distinguish multipath channel contributed from direct path (direct link) and from indirect path (indirect link), and the network node may just estimate the compound channel composed by both direct link and indirect link. In this manner, the computation complexity for uplink data processing at the network node is greatly saved.

In addition, by transmitting identical baseband data signals or identical reference signals, power-aggregation gain may be obtained. Since the baseband signals, if extracted from the RF signals received at the network node, are identical, the power of the received signal can be increased (e.g., doubled when the received signals are combined or aggregated by the network node) as compared to the case without device collaboration.

In addition, since the same frequency band (e.g., the first frequency band f1) is utilized by two devices (e.g., the primary communication apparatus and the collaborating communication apparatus), a same frequency network (SFN) is formed based on the framework of device collaboration.

In some implementations, the network node may transmit an indication to the primary communication apparatus (primary UE) to indicate that transmission of identical uplink baseband signal to the network node when device collaboration is enabled, and may also transmit a control signal indicating one or more transmission parameters to the primary communication apparatus to support device collaboration. The primary communication apparatus may selectively provide information regarding the transmission parameters to the collaborating communication apparatus.

In some implementations, the primary communication apparatus (primary UE) may receive the indication from the network node which indicates the transmissions of identical baseband signal to the network node and to the collaborating communication apparatus respectively on first time-frequency resources comprising the first frequency band and on second time-frequency resources comprising the second frequency band.

In some implementations, the primary communication apparatus (primary UE) may receive an indication from the network node which indicates the transmissions of identical uplink baseband signal to the network node and to the collaborating communication apparatus respectively on a first set of resource elements in the first frequency band and on a second set of resource elements in the second frequency band.

In some implementations, the network node may also not transmit any indication to the primary communication apparatus. In such implementations, device collaboration and transmission parameters to support device collaboration may be pre-configured to the primary communication apparatus, and the primary communication apparatus may also selectively provide information regarding the transmission parameters to the collaborating communication apparatus.

In some implementations, the first frequency band and the second frequency band do not overlap with each other. In some implementations, a position of the second frequency band is a constant offset relative to the first frequency band.

In some implementations, the first time-frequency resources and the second time-frequency resources do not overlap with each other. In some implementations, the first time-frequency resources and the second time-frequency resources do not overlap with each other in a frequency domain. In some implementations, the first time-frequency resources and the second time-frequency resources do not overlap with each other in a frequency domain and overlap with each other in a time domain.

In some implementations, the first time-frequency resources and the second time-frequency resources are in two non-overlapped bands, in two non-overlapped component carriers, or in two non-overlapped sets of resource blocks within a component carrier.

In some implementations, with device collaboration, the precoding may be designed for the primary communication apparatus across two frequency bands or for the collaborating communication apparatus to form a good R-to-T (receiving-to-transmitting) signal processing matrix G, such as the linear transformation $G_{2\times 4}$ in the signal model illustrated in equation Eq. (1) or Eq. (2).

In some implementations, the primary communication apparatus may apply a first precoder on the first baseband signal and apply a second precoder on the second baseband signal. In some implementations, a third RF signal may be generated by the collaborating communication apparatus based on the received second RF signal (e.g., by carrying out the aforementioned operations such as liner combination, amplification, or the likes), and the collaborating communication apparatus may transmit the third RF signal to the network node.

In some implementations, the network node may perform channel estimation for the channel 424 and select a first precoder or a second precoder for the primary communication apparatus based on the channel estimation result. The primary communication apparatus may receive an indication indicating information regarding the precoders from the network node.

In some implementations, the primary communication apparatus may transmit an indication indicating information regarding a third precoder to the collaborating communication apparatus, wherein the third precoder applied on the third RF signal is determined based on the information regarding the third precoder. That is, the collaborating communication apparatus may be informed of the using of the third precoder by the primary communication apparatus. The collaborating communication apparatus may be informed of the using the same precoder (i.e., the first precoder used by the primary communication apparatus for transmission to network node) on the third RF signal generated based on the received second RF signal.

In some implementations, since the angle of departures (AODs) of the two signals to be transmitted to the network node (e.g., the first RF signal coming from the direct path and the third RF signal coming from the indirect path) are similar, the primary communication apparatus and the collaborating communication apparatus may apply or follow the same precoder for the transmission in the first frequency band f1.

In some alternative implementations, the primary communication apparatus may apply random beamforming (e.g., randomly select a precoder from a set of precoder candidates), and the collaborating communication apparatus may also apply random beamforming. In this approach, less control signaling overhead for precoder is expected.

More specifically, the primary communication apparatus may apply a first precoder on the first baseband signal and apply a second precoder on the second baseband signal, wherein the first precoder is randomly selected from a first set of precoder candidates, the second precoder is randomly selected from a second set of precoder candidates, and a third precoder applied on the third RF signal may also be randomly selected from a third set of precoder candidates. Note that in some implementations, the primary communication apparatus and the collaborating communication apparatus may also select a precoder from the set of precoder candidates in a round robin manner. Note further that in this approach, the primary communication apparatus and the collaborating communication apparatus may apply either the same precoder or different precoders for the transmission in the first frequency band f1.

In some implementations, the network node may be a satellite. Regarding the resource availability for the local link (e.g., the second frequency band f2), since it may be typically out of coverage in NR enhanced mobile broadband (eMBB) bands for a non-terrestrial network (NTN) use case, it may be safe to reuse NR eMBB bands for f2, simply because no victim UE or gNB exists.

In addition, for satellite communication, UE's Tx power is critical for UL transmission due to large pathloss between UE and satellite. With the proposed scheme of device collaboration, the potential benefit may comprise beamforming gain and power-aggregation gain. Even though Tx beamforming may not be well controlled (because it may not be easy to acquire all channel information), sufficient power gain can still be obtained by simple random beamforming.

Illustrative Implementations

Figure 5:
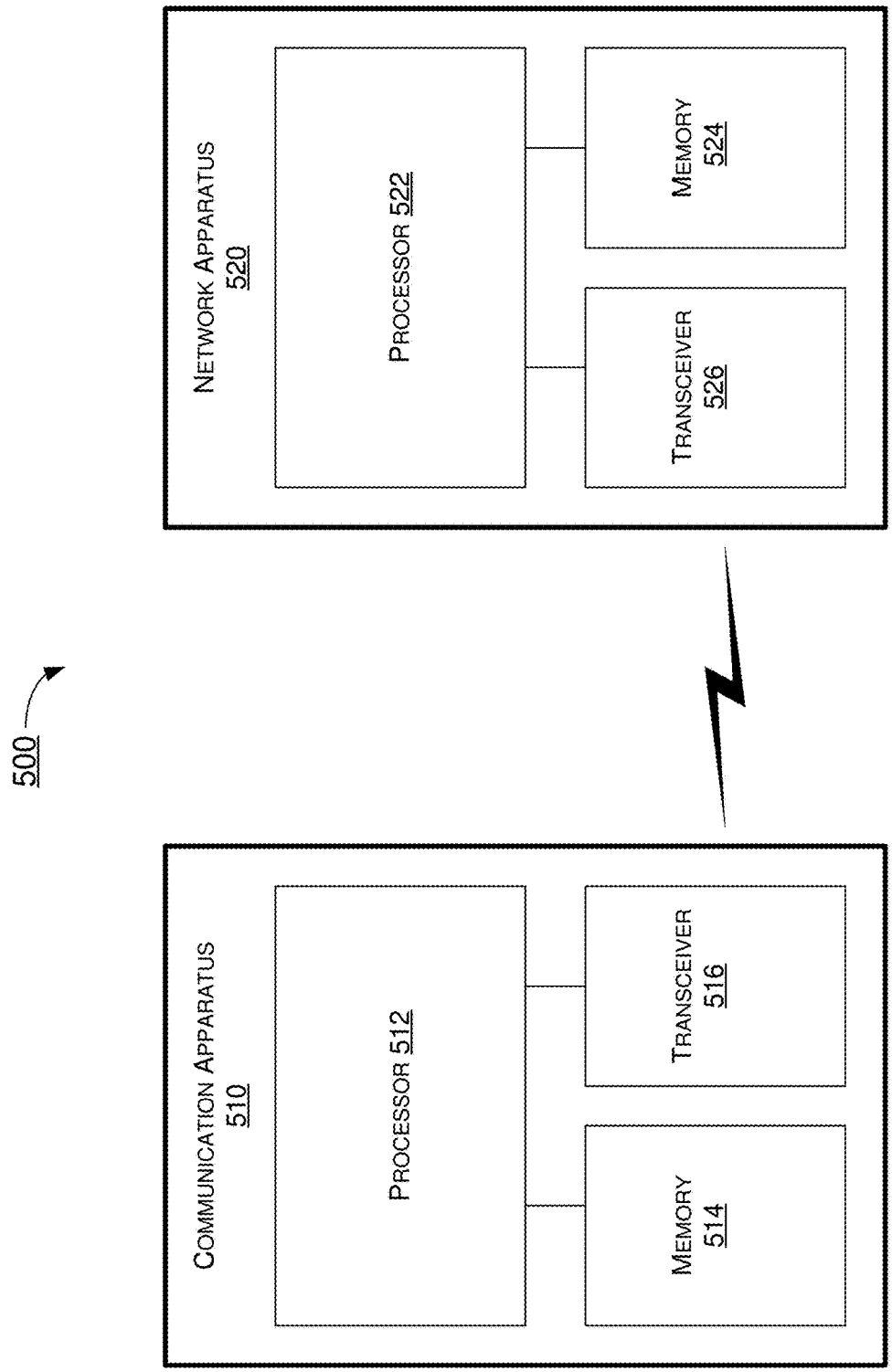
FIG. 5 is a diagram depicting an example communication system having an example communication apparatus and an example network apparatus in accordance with an implementation of the present disclosure.

FIG. 5 illustrates an example communication system 500 having an example communication apparatus 510 and an example network apparatus 520 in accordance with an implementation of the present disclosure. Each of the communication apparatus 510 and the network apparatus 520 may perform various functions to implement schemes, techniques, processes and methods described herein pertaining to transceiving capability augmentation with respect to the communication apparatus and the network apparatus supporting device collaboration in mobile communications, including scenarios/schemes described above as well as the process 600 described below.

Communication apparatus 510 may be a part of an electronic apparatus, which may be a UE such as a portable or mobile apparatus, a wearable apparatus, a wireless communication apparatus or a computing apparatus. For instance, the communication apparatus 510 may be implemented in a smartphone, a smartwatch, a personal digital assistant, a digital camera, or a computing equipment such as a tablet computer, a laptop computer or a notebook computer. The communication apparatus 510 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, the communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. The communication apparatus 510 may include at least some of those components shown in FIG. 5 such as a processor 512, for example. The communication apparatus 510 may further include one or more other components not pertinent to the proposed scheme of the present disclosure (e.g., internal power supply, display device and/or user interface device), and, thus, such component(s) of the communication apparatus 510 are neither shown in FIG. 5 nor described below in the interest of simplicity and brevity.

The network apparatus 520 may be a part of a network device, which may be a network node such as a satellite, a base station, a small cell, a router or a gateway. For instance, the network apparatus 520 may be implemented in an eNodeB in an LTE network, in a gNB in a 5G/NR, IoT, NB-IoT or IIoT network or in a satellite or base station in a 6G network. Alternatively, network apparatus 520 may be implemented in the form of one or more IC chips such as, for example and without limitation, one or more single-core processors, one or more multi-core processors, or one or more RISC or CISC processors. The network apparatus 520 may include at least some of those components shown in FIG. 5 such as a processor 522, for example. The network apparatus 520 may further include one or more other components not pertinent to the proposed scheme of the present disclosure (e.g., internal power supply, display device and/or user interface device), and, thus, such component(s) of the network apparatus 520 are neither shown in FIG. 5 nor described below in the interest of simplicity and brevity.

In one aspect, each of the processor 512 and the processor 522 may be implemented in the form of one or more single-core processors, one or more multi-core processors, or one or more CISC processors. That is, even though a singular term "a processor" is used herein to refer to the processor 512 and the processor 522, each of the processor 512 and the processor 522 may include multiple processors in some implementations and a single processor in other implementations in accordance with the present disclosure. In another aspect, each of the processor 512 and the processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of the processor 512 and the processor 522 is a special-purpose machine specifically designed, arranged and configured to perform specific tasks including autonomous reliability enhancements in a device (e.g., as represented by communication apparatus 510) and a network (e.g., as represented by network apparatus 520) in accordance with various implementations of the present disclosure.

In some implementations, the communication apparatus 510 may also include a transceiver 516 coupled to the processor 512 and capable of wirelessly transmitting and receiving data. In some implementations, the communication apparatus 510 may further include a memory 514 coupled to the processor 512 and capable of being accessed by the processor 512 and storing data therein. In some implementations, the network apparatus 520 may also include a transceiver 526 coupled to the processor 522 and capable of wirelessly transmitting and receiving data. In some implementations, the network apparatus 520 may have a plurality of physical antennas which associates with a plurality of antenna ports. In some implementations, the network apparatus 520 may further include a memory 524 coupled to processor 522 and capable of being accessed by the processor 522 and storing data therein. Accordingly, communication apparatus 510 and the network apparatus 520 may wirelessly communicate with each other via the transceiver 516 and the transceiver 526, respectively. To aid better understanding, the following description of the operations, functionalities and capabilities of each of the communication apparatus 510 and the network apparatus 520 is provided in the context of a mobile communication environment in which the communication apparatus 510 is implemented in or as a communication apparatus or a UE and the network apparatus 520 is implemented in or as a network node or a network device of a communication network.

In some implementations, the processor 512 of the communication apparatus 510 may transmit, via the transceiver 516, a first RF signal carrying a first baseband signal in a first frequency band to a network node, such as the network apparatus 520, and transmit, via the transceiver 516, a second RF signal carrying a second baseband signal in a second frequency band to a collaborating communication apparatus, such as another communication apparatus. The first baseband signal and the second baseband signal are identical, and the first frequency band is different from the second frequency band.

In some implementations, the first baseband signal and the second baseband signal may comprise baseband data signals.

In some implementations, the first baseband signal and the second baseband signal may comprise reference signals.

In some implementations, the second RF signal is converted to the first frequency band by the collaborating communication apparatus.

In some implementations, the first frequency band and the second frequency band do not overlap with each other.

In some implementations, a position of the second frequency band is a constant offset relative to the first frequency band.

In some implementations, the processor 512 may receive, via the transceiver 516, an indication from the network node which indicates transmissions of identical uplink baseband signal to the network node and to the collaborating communication apparatus respectively on first time-frequency resources comprising the first frequency band and on second time-frequency resources comprising the second frequency band. In some implementations, the first time-frequency resources and the second time-frequency resources do not overlap with each other in a frequency domain and the second baseband signal is to be received at the network node.

In some implementations, the processor 512 may apply a first precoder on the first baseband signal and apply a second precoder on the second baseband signal.

In some implementations, the processor 512 may receive, via the transceiver 516, an indication indicating information regarding the first precoder or the second precoder from the network node.

In some implementations, the first precoder may be randomly selected from a first set of precoder candidates or the second precoder may be randomly selected from a second set of precoder candidates.

In some implementations, the processor 512 may transmit, via the transceiver 516, an indication indicating information regarding a third precoder to the collaborating communication apparatus. The third precoder may be applied to form a third RF signal transmitted by the collaborating communication apparatus to the network node, and the third RF signal may be generated by the collaborating communication apparatus based on the second RF signal and the information regarding the third precoder.

In some implementations, the indication may further indicate that the third precoder is randomly selected from a third set of precoder candidates or indicates that the third precoder is identical to the first precoder.

Illustrative Processes

Figure 6:
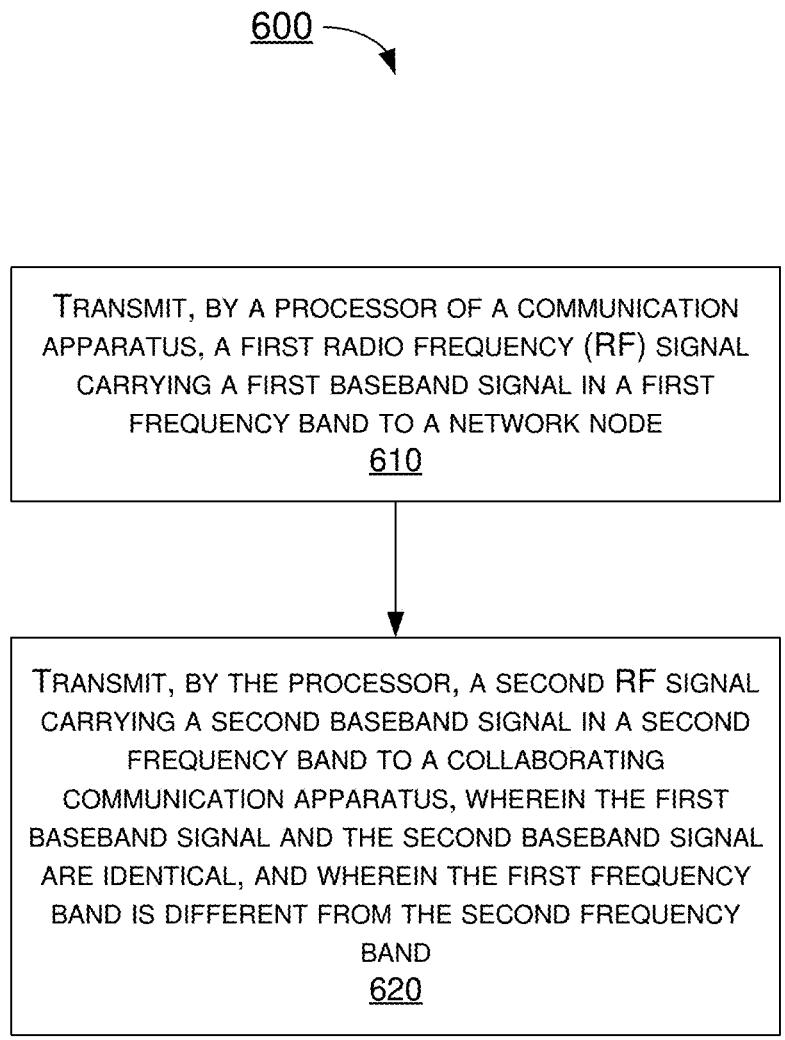
FIG. 6 is a diagram depicting an example process in accordance with an implementation of the present disclosure.

FIG. 6 depicting an example process 600 in accordance with an implementation of the present disclosure. The process 600 may be an example implementation of above scenarios/schemes, whether partially or completely, with respect to transceiving capability augmentation based on device collaboration in accordance with the present disclosure. The process 600 may represent an aspect of implementation of features of the communication apparatus 510. The process 600 may include one or more operations, actions, or functions as illustrated by one or more of blocks 610 and 620. Although illustrated as discrete blocks, various blocks of the process 600 may be divided into additional blocks, combined into fewer blocks, or eliminated, depending on the desired implementation. Moreover, the blocks of the process 600 may be executed in the order shown in FIG. 6 or, alternatively, in a different order. The process 600 may be implemented by the communication apparatus 510 or any suitable UE or machine type devices. Solely for illustrative purposes and without limitation, the process 600 is described below in the context of the communication apparatus 510. The process 600 may begin at block 610.

At 610, the process 600 may involve the processor 512 of the communication apparatus 510 transmitting a first radio frequency (RF) signal carrying a first baseband signal in a first frequency band to a network node, such as the network apparatus 520.

The process 600 may proceed from 610 to 620.

At 620, the process 600 may involve the processor 512 transmitting a second RF signal carrying a second baseband signal in a second frequency band to a collaborating communication apparatus, such as another communication apparatus. The first baseband signal and the second baseband signal are identical, and the first frequency band is different from the second frequency band.

In some implementations, the first baseband signal and the second baseband signal may comprise baseband data signals.

In some implementations, the first baseband signal and the second baseband signal may comprise reference signals.

In some implementations, the second RF signal may be converted to the first frequency band by the collaborating communication apparatus.

In some implementations, the first frequency band and the second frequency band do not overlap with each other.

In some implementations, a position of the second frequency band is a constant offset relative to the first frequency band.

In some implementations, the process 600 may involve the processor 512 receiving an indication from the network node which indicates transmissions of identical uplink baseband signal to the network node and to the collaborating communication apparatus respectively on first time-frequency resources comprising the first frequency band and on second time-frequency resources comprising the second frequency band. The first time-frequency resources and the second time-frequency resources do not overlap with each other in a frequency domain, and the second baseband signal is to be received at the network node.

In some implementations, the process 600 may involve the processor 512 applying a first precoder on the first baseband signal and applying a second precoder on the second baseband signal.

In some implementations, the process 600 may involve the processor 512 receiving an indication indicating information regarding the first precoder or the second precoder from the network node.

In some implementations, the first precoder may be randomly selected from a first set of precoder candidates or the second precoder may be randomly selected from a second set of precoder candidates.

In some implementations, the process 600 may involve the processor 512 transmitting an indication indicating information regarding a third precoder to the collaborating communication apparatus. The third precoder is applied to form a third RF signal transmitted by the collaborating communication apparatus to the network node, and the third RF signal is generated by the collaborating communication apparatus based on the second RF signal and the information regarding the third precoder.

In some implementations, the indication further indicates that the third precoder is randomly selected from a third set of precoder candidates or indicates that the third precoder is identical to the first precoder.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of a communication apparatus, a first radio frequency (RF) signal carrying a first baseband signal in a first frequency band to a network node; and
   transmitting, by the processor, a second RF signal carrying a second baseband signal in a second frequency band to a collaborating communication apparatus, wherein the first baseband signal and the second baseband signal are identical, wherein the first frequency band is different from the second frequency band, and wherein the first frequency band and the second frequency band do not overlap with each other or a position of the second frequency band is a constant offset relative to the first frequency band.

2. The method of claim 1, wherein the first baseband signal and the second baseband signal comprise baseband data signals or the first baseband signal and the second baseband signal comprise reference signals.

3. The method of claim 1, wherein the second RF signal is converted to the first frequency band by the collaborating communication apparatus.

4. The method of claim 1, further comprising:
receiving, by the processor, an indication from the network node which indicates transmissions of identical uplink baseband signal to the network node and to the collaborating communication apparatus respectively on the first frequency band and the second frequency band.

5. The method of claim 1, further comprising:
applying, by the processor, a first precoder on the first baseband signal; and
applying, by the processor, a second precoder on the second baseband signal.

6. The method of claim 5, further comprising:
receiving, by the processor, an indication indicating information regarding the first precoder or the second precoder from the network node.

7. The method of claim 5, wherein the first precoder is randomly selected from a first set of precoder candidates or the second precoder is randomly selected from a second set of precoder candidates.

8. The method of claim 5, further comprising:
transmitting, by the processor, an indication indicating information regarding a third precoder to the collaborating communication apparatus,
wherein the third precoder is applied to form a third RF signal transmitted by the collaborating communication apparatus to the network node, and wherein the third RF signal is generated by the collaborating communication apparatus based on the second RF signal and the information regarding the third precoder.

9. The method of claim 8, wherein the indication further indicates that the third precoder is randomly selected from a third set of precoder candidates or indicates that the third precoder is identical to the first precoder.

10. A communication apparatus, comprising:
a transceiver which, during operation, wirelessly communicates with at least one network node; and
a processor communicatively coupled to the transceiver such that, during operation, the processor performs operations comprising:
transmitting, via the transceiver, a first radio frequency (RF) signal carrying a first baseband signal in a first frequency band to the network node; and
transmitting, via the transceiver, a second RF signal carrying a second baseband signal in a second frequency band to a collaborating communication apparatus,
wherein the first baseband signal and the second baseband signal are identical, wherein the first frequency band is different from the second frequency band, and wherein the first frequency band and the second frequency band do not overlap with each other or a position of the second frequency band is a constant offset relative to the first frequency band.

11. The communication apparatus of claim 10, wherein the first baseband signal and the second baseband signal comprise baseband data signals or the first baseband signal and the second baseband signal comprise reference signals.

12. The communication apparatus of claim 10, wherein the second RF signal is converted to the first frequency band by the collaborating communication apparatus.

13. The communication apparatus of claim 10, wherein, during operation, the processor further performs operations comprising:
receiving, via the transceiver, an indication from the network node which indicates transmissions of identical uplink baseband signal to the network node and to the collaborating communication apparatus respectively on the first frequency band and the second frequency band.

14. The communication apparatus of claim 10, wherein, during operation, the processor further performs operations comprising:
applying a first precoder on the first baseband signal; and
applying a second precoder on the second baseband signal.

15. The communication apparatus of claim 14, wherein, during operation, the processor further performs operations comprising:
receiving, via the transceiver, an indication indicating information regarding the first precoder or the second precoder from the network node.

16. The communication apparatus of claim 14, wherein the first precoder is randomly selected from a first set of precoder candidates or the second precoder is randomly selected from a second set of precoder candidates.

17. The communication apparatus of claim 14, wherein, during operation, the processor further performs operations comprising:
transmitting, via the transceiver, an indication indicating information regarding a third precoder to the collaborating communication apparatus, wherein the third precoder is applied to form a third RF signal transmitted by the collaborating communication apparatus to the network node, and wherein the third RF signal is generated by the collaborating communication apparatus based on the second RF signal and the information regarding the third precoder.

18. The communication apparatus of claim 17, wherein the indication further indicates that the third precoder is randomly selected from a third set of precoder candidates or indicates that the third precoder is identical to the first precoder.

* * * * *